Dec. 14, 1937.  S. PRZYBOROWSKI  2,102,573

MACHINE FOR FORMING RADIATOR RIBBONS

Filed Jan. 28, 1935  5 Sheets-Sheet 1

Inventor
Stanislaus Przyborowski

By Albert R. Henry

Attorney

Dec. 14, 1937.  S. PRZYBOROWSKI  2,102,573
MACHINE FOR FORMING RADIATOR RIBBONS
Filed Jan. 28, 1935   5 Sheets-Sheet 3

Inventor
Stanislaus Przyborowski
By Albert R Henry
Attorney

Dec. 14, 1937.                S. PRZYBOROWSKI                2,102,573
                    MACHINE FOR FORMING RADIATOR RIBBONS
                    Filed Jan. 28, 1935        5 Sheets-Sheet 5

Inventor
Stanislaus Przyborowski
Albert R Henry
Attorney

Patented Dec. 14, 1937

2,102,573

UNITED STATES PATENT OFFICE 2,102,573

MACHINE FOR FORMING RADIATOR RIBBONS

Stanislaus Przyborowski, Buffalo, N. Y., assignor to Fedders Manufacturing Company, Inc., Buffalo, N. Y.

Application January 28, 1935, Serial No. 3,796

7 Claims. (Cl. 113—1)

This invention relates to the art of making automobile radiator cores of the cellular type, and it has reference to a machine for making improved elements for such cores.

Cores of this type have long been produced by arranging previously assembled ribbon units in juxtaposed relation and solder dipping the faces of the assembly to provide a rigid and substantially homogeneous structure. The units have been formed of an outer or water bearing ribbon bent upon itself to form an enclosure and an inner or spacer ribbon or ribbons inserted therein and providing air fin elements.

In connecting the free ends of the outer ribbon to complete the enclosure, various types of interlocking joints have been utilized, none of which have proved waterproof, and as a result, it has been common practice to solder these joints by dipping the ends of the previously integrated core. This practice has caused much trouble, as the solder thus has been applied impartially to the entire area of the core ends, with the objections that water passages have been blocked by solder and dross, solder has been wasted, and most serious, the previously soldered ribbons have been reheated and the joints therein accordingly weakened. Recently, these objections have been considerably aggravated, due to the demand for cores having irregular ends, which has necessitated group dipping or hand soldering non-planar portions of the core ends.

I propose to eliminate entirely the steps of dipping the ends of the core by providing a core wherein the joints are soldered at the same time the core is integrated by face dipping. To this end, I provide an outer ribbon structure where the joint has been provided with an advantageously located insert of cold solder wire containing its own flux, and which, when the core is face dipped, will be fused in the joint without waste or defacement of the core ends.

In the ensuing specification I have described one known form of radiator unit containing the solder wire insert and have also shown and described a machine for forming the joints in such manner.

Figures 1, 2, 3, 4:
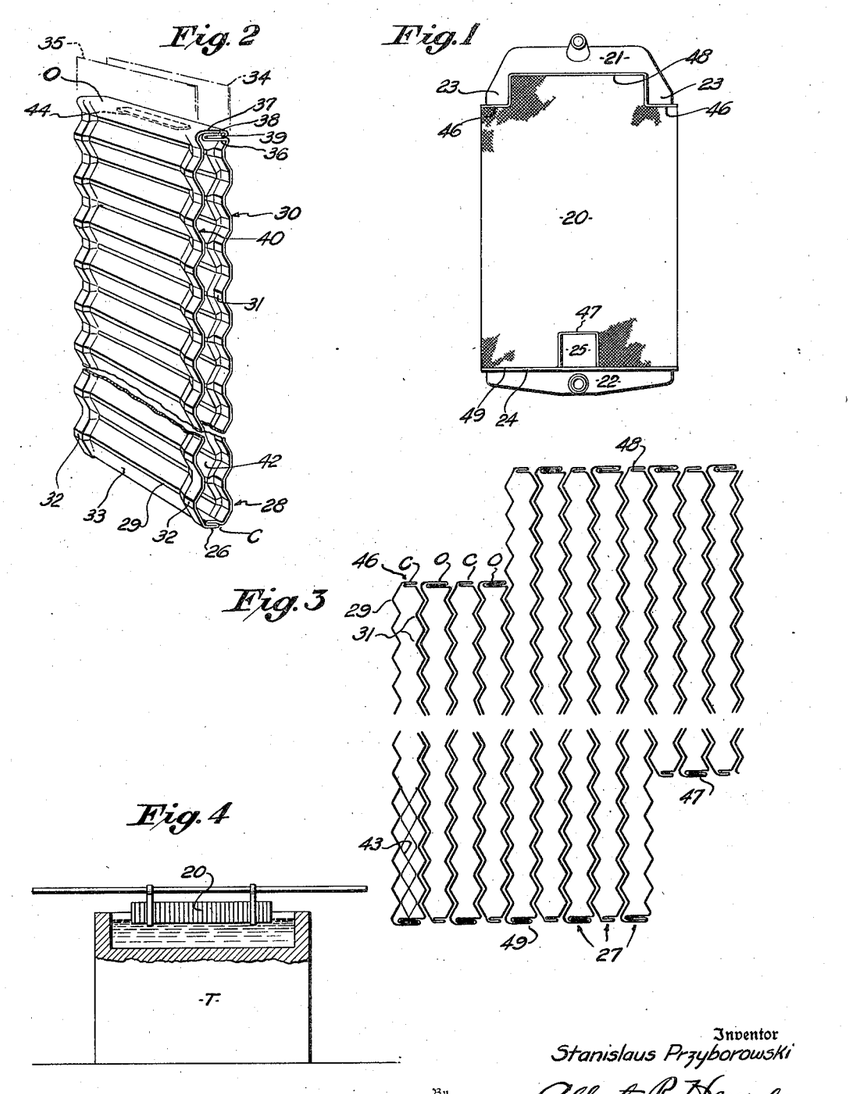
Fig. 1 is a front elevation of a radiator assembly including top and bottom tanks.
Fig. 2 is a perspective view of a completed outer ribbon.
Fig. 3 is an enlarged diagrammatic cross section through the left hand portion of the core of Fig. 1.
Fig. 4 is a vertical section through a dipping tank showing a radiator being surface dipped therein.
Figure 5:
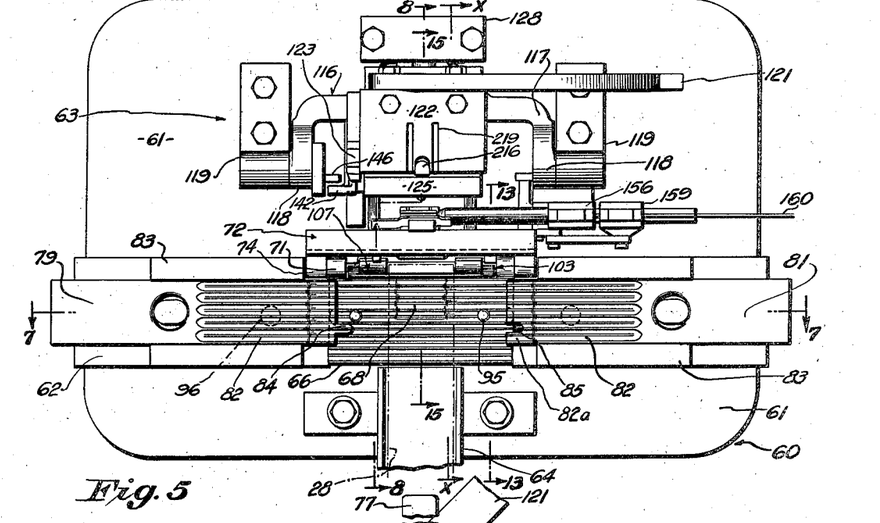
Fig. 5 is a top view of a machine for forming the joint in the outer ribbon. In this view the holding jig and the dies are shown in an open inoperative position.
Figure 6:
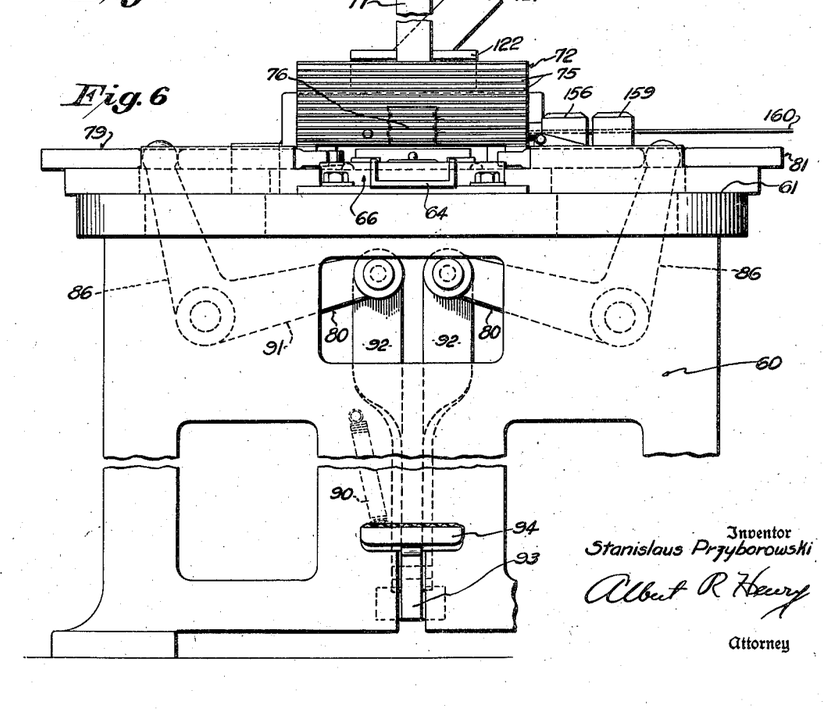
Fig. 6 is a front view of the machine as shown in Fig. 5.

In the drawings, Fig. 1 shows a radiator comprising a core 20 of the cellular type to which is secured an upper tank 21 and a lower tank 22. To illustrate the adaptability of the core structure of the invention, the upper tank is shown as of an exceptional type having depending portions 23 at opposite ends to which the core is devised to conform. The lower tank has the conventional planar flanged face 24, and the usual attached crank box 25 which presents a rectilinear insert in the lower face of the core.

The core 20 is likewise of a familiar type, consisting of juxtaposed sections or units 27 (Figs. 2 and 3) each comprising a water tube ribbon or "outer" 28 formed with transverse corrugations defined by outer crests 29 and inner crests 31, and having longitudinal offset portions 32 at opposite sides forming a longitudinal depression 33 therebetween. This ribbon is cut into suitable lengths and then folded into two legs 30 and 40 having their inner crests 31 disposed in opposition (Fig. 2). On the line of fold, the ribbon is overlapped as indicated by the numeral 26, so that the crests 31 are spaced, and additionally, a tapering characteristic is given this end of the outer, which will hereinafter be referred to as the closed end header "C".

The free ends 34 and 35 of the ribbon legs 30 and 40 are subsequently folded inward from the outer crests 29, forming horizontal sections 36 and 37, and bent back to form sections 38 and 39 respectively, which sections interlock as shown in Figs. 2 and 3, to complete the open end header "O".

The enclosure 42 thus provided within the outer 28 is utilized to receive a spacer or corrugated double fin ribbon 43, which is shown diagrammatically in Fig. 3, and, since it has only a casual bearing on the present invention, it will not be further discussed. As thus far described, the core is of the conventional double spacer, cellular type, and old with me. It is used for exemplary purposes to illustrate the invention, and it will be hereinafter apparent that other forms of cellular cores may be utilized with equal facility.

Simultaneously with the formation of the open end header O, I propose to insert a section 44 of solder wire in the interlocking joint thereof (Fig. 2) so that in the assembly it is flattened and securely imprisoned. This wire is preferably of a known commercial type, being tubular with a core of flux. And it is thus adapted, when fused by the suitable application of heat, to seal the joint in an effective manner.

To assemble the core, the ribbon sections are stacked in a suitable frame in internesting relation, and with alternate sections inverted, so that the headers C and O thereof are disposed alternately to provide planar and substantially uninterrupted horizontal surfaces for the subsequent reception of the tanks. The sections are then clamped together and the front and rear surfaces are successively immersed in a tank T of molten solder for a slight depth (Fig. 4). As a result, the inner and outer ribbons are integrated and likewise the water passages between the outer ribbons are sealed to form an integral structure.

During the described solder dipping operation, the ribbons become heated sufficiently to fuse the solder inserts 44 in the open end headers O, and, when the core is permitted to cool, it will be found that the interlocking joint structures therein are perfectly sealed.

In contrast, prior to the present invention, it was necessary to solder the open end headers O in a separate operation. In cores having planar upper and lower faces, this involved the solder dipping thereof after the front and rear face dipping operation, with the attendant danger of reheating, the waste of solder, and the danger of blocking or partially blocking the open water passages.

In cores having offset portions, such as shown in Fig. 1, the header surfaces 46 and 47 remote from the extreme top and bottom surfaces 48 and 49, had to be separately soldered, involving the end dipping of these groups of sections prior to assembly and the subsequent end dipping of the surfaces 48 and 49 after assembly. In the present invention, regardless of frontal irregularity of the core, the interlocking joints are all sealed in the face dipping operation, thus eliminating what has previously been considered necessary extra operations.

The machine shown in Figs. 5 to 17 is adapted to form the interlocking joint of the open end header O and simultaneously to position the solder insert 44 therein. The machine comprises a table 60 having a top 61 upon which is mounted a bending die mechanism including a holding jig 62 and an organization 63 of bending die units. A solder feeding and positioning mechanism is operated by and during operation of the bending die and mechanism, and certain of its portions are mounted on the table, while other portions are directly dependent for their support and movement upon several elements of the die mechanism, as hereinafter described. The ribbons 28 are fed singly into the mechanism with their free ends 34 and 35 disposed in the jig and their remaining portions supported on a guide channel 64 secured to the top 61.

*The holding jig*

This unit comprises a block 66 which is secured to the table top 61 and which is formed with transverse corrugations 67 adapted to receive the outer crests 29 of the ribbon leg 40. Several of the uppermost corrugations are additionally provided with central raised portions 68 which fit into the central depressed portion 33 of the ribbon. The rear face 69 of the block is formed with two elevated protruding lugs 71 which are horizontally drilled to provide hinge bearings. An upper or hinged jig block 72 is provided, and its rear face 73 is formed with similar lugs 74 which straddle the lugs 71 and receive hinge pins 70 to provide a pivotal mounting therewith. The lower face of this block is formed with transverse corrugations 75 having central raised portions 76 thereon adapted to engage the ribbon leg 30. A handle 77 is secured to the opposite face, whereby the block may be swung from a vertical to a horizontal position with its corrugated surface disposed in spaced and parallel relation to the corresponding surface of the stationary block 66.

Horizontally movable opposed blocks 79 and 81 are provided to engage the inner surfaces of the ribbon legs 30 and 40. Both faces of the meeting extremities of these blocks are provided with longitudinal corrugations 82 matching the corrugations of the enclosing blocks 66 and 72. The ends of the corrugations are shouldered on both faces to provide offset portions 82, which, when the blocks are positioned within the ribbon legs, provide clearance for the depressions 33 therein.

The blocks 79 and 81 are each mounted in a guide channel member 83, which in turn is secured to the top 61. The opposed ends of the blocks are formed with a projecting dowel portion 84 and a slot 85, respectively, which serve to unite the blocks against relative lateral movement when they are brought together.

Unitary movement of the blocks 79 and 81 is obtained through a lever system, comprising a pair of opposed bell cranks 80 pivoted within table 60 and each having one arm 86 projecting through slots 87 and 88 (Figs. 6 and 7) in the table top 61 and guide channel 83 respectively. The extremities of the arms 86 are received in holes 89 formed in the blocks 79 and 81. The remaining arms 91 of the bell cranks are pivotally secured to connecting straps 92 which in turn are connected to an operating lever 93. The lever 93 is pivoted to the table and its extremity is provided with a pedal 94, which, when depressed, moves the arms 86 of the bell cranks and the accompanying blocks 79 and 81 inward. The return movement of the lever 93 is attained by a tension spring 90 secured between the lever and the table.

Aside from the described horizontal movement of the blocks 79 and 81, the inner ends thereof are temporarily raised during each inward movement. This movement is obtained by means of cam studs 95 inserted in the stationary block 66 and engageable by the block ends to provide an elevating movement. The blocks are permitted to be restored to their planar disposal immediately before they contact by means of a depression 96 formed in the lower face of each for receiving the studs 95.

In the operation of the holding jig, the leg 40 of the ribbon is positioned in the corrugations of the stationary block 66 with its extremity projecting beyond the rear face 69 thereof, the pedal 94 is then depressed to move the horizontal blocks 79 and 81 inward into contacting relation, thus covering this end of the ribbon. The slight upward movement of the blocks 79 and 81 insures the clearing of the edges of the ribbon and prevents scoring of the ribbon by the blocks.

Succeeding this step, the remaining ribbon leg 30 is positioned on the upper side of the united blocks 79 and 81 and in the corrugations thereof. The hinged jig block 72 is then swung into position upon the horizontal blocks to cover the end portion of the ribbon leg 30.

With the hinged block 72 retained in this position, the underlying horizontal blocks are locked against horizontal return movement due to the location of the cam studs 95 in the depressions 96.

The ribbon legs 30 and 40 are thus clamped in the holding jig 62 with the free ends 34 and 35 thereof projecting (Fig. 8) preparatory to the formation of the interlocking joint therein.

The bending dies

Figure 8:
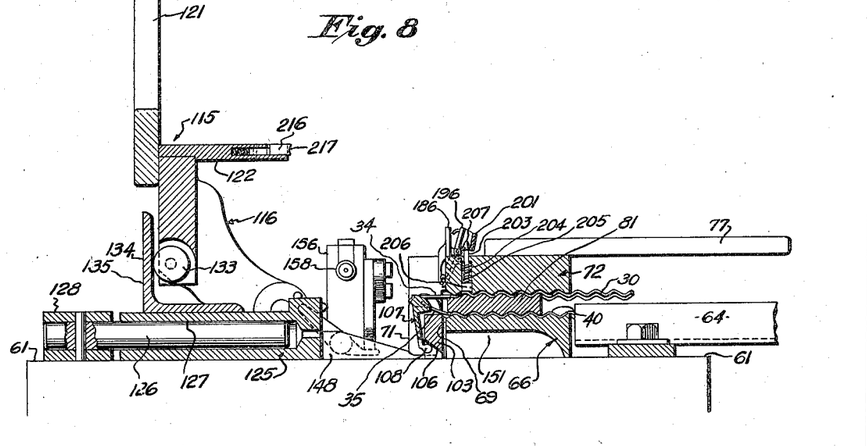
Fig. 8 is an enlarged section on the line 8—8 of Fig. 5, with the jig shown in a closed position.

The lugs 71 of the fixed jig block 66 are each formed with inward projecting shouldered portions 101 having tapered faces 102 spaced from the face 69 of the block (Fig. 13) and serving as guideways for opposite extremities of a vertically movable die 103. The die normally rests on the table top 61 and it is formed with a circular groove 104 opening in its rear face 105 and with a pair of transverse beveled notches 106 (Fig. 8).

A second die 107 is formed with a cylindrical lower extremity 108 which is inserted in the groove 104 of the die 103, thus providing a limited hinge connection between the dies. The upper end of the die 107 is formed with a projecting portion 109 which is spaced from the underlying top surface 111 of the die 103 and which is formed with a cam bead 112 on its rear surface and rounded cam face 113 on its front upper corner. A notch 114 is provided in the central part of the portion 109 to provide clearance for the extremities of the projecting ends 34 and 35 of the ribbon legs. It will be observed that the end 35 rests upon the lower wall of the notch in a slightly bent position after the jig blocks are clamped in place.

Figure 9:
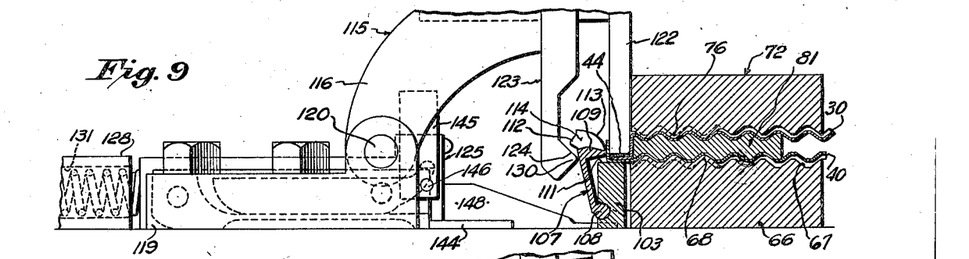
Figs. 9, 10, 11, and 12 are all enlarged sections on the line X—X of Fig. 5, and showing progressively the bending operations performed by the bending dies, and their positions and cooperation therein.
Figure 10:
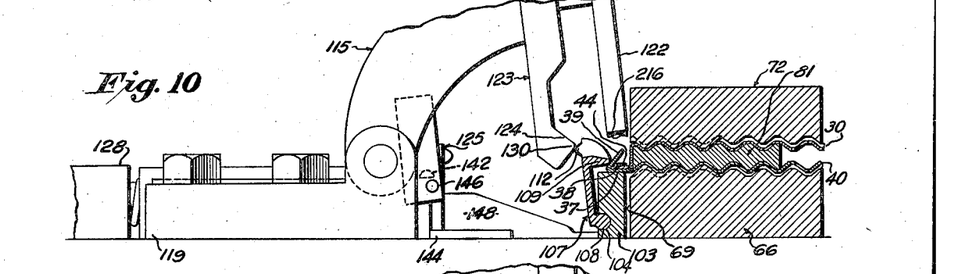
Figure 11:
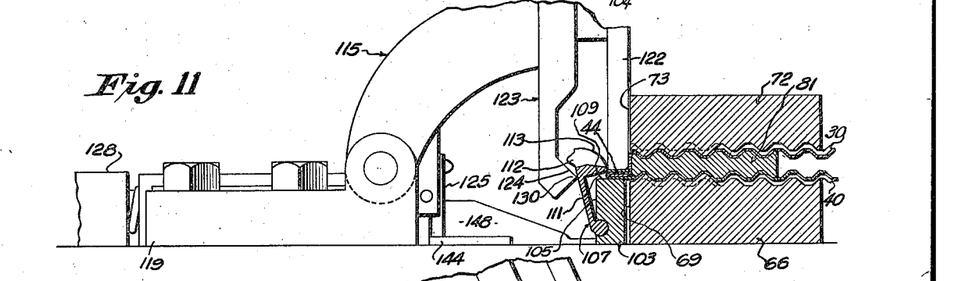

A pivoted die unit 115 cooperates with the described dies 103 and 107 to form the steps of forming the interlocking joint shown progressively in Figs. 9, 10, and 11. This unit comprises a bracket 116 having spaced depending arms 117 terminating in horizontal bearing portions 118. A pair of bearing blocks 119 are secured to the table top 61 and they each carry a hinge pin 120 for the adjacent bearing portion 118. A handle 121 is secured diagonally to the upper face of the bracket whereby the bracket may be moved from a vertical or inoperative position (Figs. 4, 5, and 8) to a horizontal operative position, (Figs. 9 to 12).

A die plate 122 is secured to the front face of the bracket 116 and its free extremity is adapted to clear the rear faces of the jig blocks and to register with the dies 103 and 107. A cam member 123 is secured to the bracket adjacent the die 122 and it is formed with a notched front surface providing an angular cam face 124 merging into a rounded front edge 130. The central portion of the die plate is formed to receive a spring pressed ejector 216 (Figs. 5 and 8) having a shallow transverse depression 217 in its face. On each side of the ejector, vertical clearance slots 219 are formed, which, together with the ejector, cooperate with the solder feeding mechanism hereinafter described.

Figure 12:
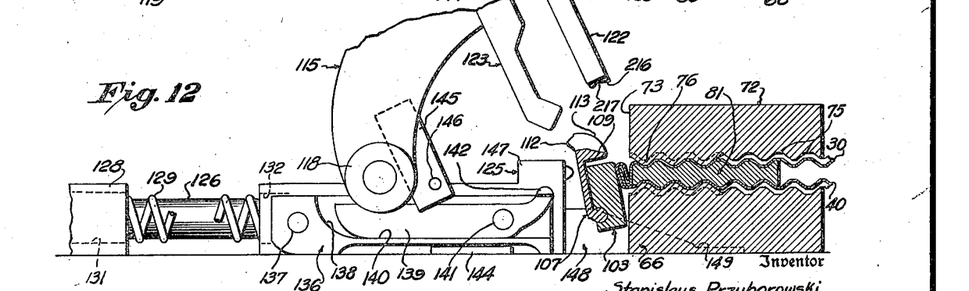
Figure 13:
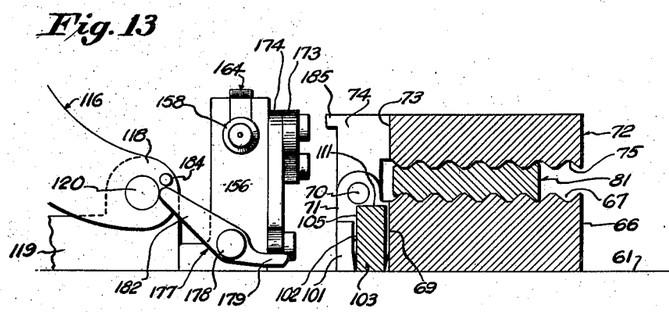
Fig. 13 is an enlarged section on the line 13—13 of Fig. 5, showing particularly the solder feeding mechanism.

A third die unit completes the die mechanism and it comprises a horizontally movable die 125 slidably mounted on the top 61 between the arms 117 of the bracket 116. This member is guided for movement toward and from the dies 103 and 107 by a guide pin 126 slidably mounted in a hole 127 therein and secured to a block 128 fastened to the rear of the table top 61 (Fig. 8). A pair of compression springs 129 are mounted within holes 131 in the block, and they also engage in holes 132 in the die 125. The die is normally retained in its rear position (Figs. 4, 9, 10 and 11) with the springs compressed preparatory to release of the block for impact with the die 107 (Fig. 12).

The described bracket 116 is utilized to move the die 125 to its rear position, as it is provided with a roller 133 (Fig. 8) mounted in its rear edge which is engageable during the return stroke with the vertical leg 134 of an angle 135 secured to the die 125, and by a cam action it forces the die 125 rearward against the resistance of the springs 129.

Latching means (Figs. 9 and 12) are provided to retain the die 125 in its rear position and such means are releasable by a predetermined degree of actuation of the pivoted die unit 115. The latch is formed of two parts,—a locking bar 136 pivotally secured to one side of the die 125 by a stud 137, and having a depression 138 in its exposed face; and a trigger 139 disposed in the depression in engagement with the bottom wall 140 thereof and pivotally connected thereto by a stud 141. The forward end of the trigger is formed with a projecting finger 142. It will be apparent that any lifting action applied to the finger will result in the united upward movement of the bar 136 and trigger 139 about the stud 137, since relative counter-clockwise movement therebetween is prevented by the contact of the trigger with the wall 140. A depressing action on the finger 142, however, will swing the trigger on its stud 141 without disturbing the bar 136.

Figure 7:
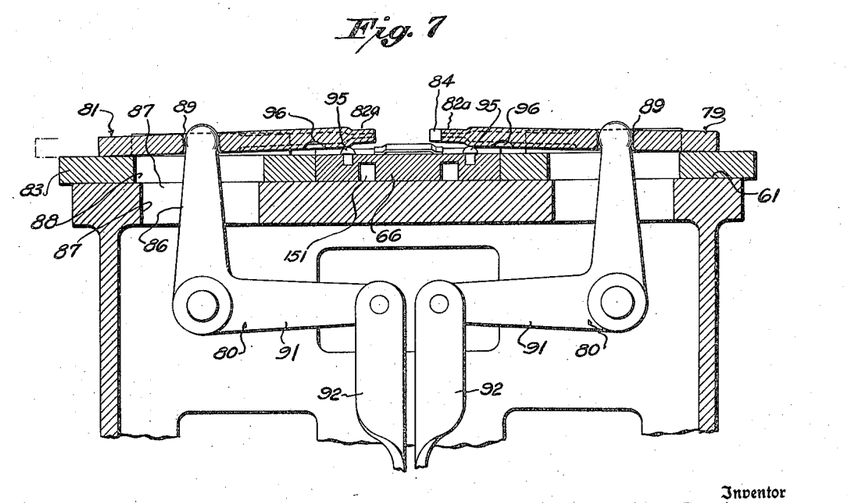
Fig. 7 is a section on the line 7—7 of Fig. 5, with the jig shown in a partially closed position.

The bar 136 is engageable with a stop member 144 secured to the table top 61 to retain the die 125 in its rearward or loaded position. A block 145 is secured to a bracket arm 117 of the pivoted die unit 115, and it carries a projecting pin 146 which engages and passes the finger 142 during downward arcuate movement of the unit. Upon subsequent upward movement of the unit 115, the pin 146 engages the finger 142 after approximately 30 degrees of movement, whereupon the bar 136 is lifted to release the die 125 for impact with the dies 103 and 107. The forward face of the die 125 is provided with an offset striking portion 147 for this purpose, and additionally with a pair of projecting wedge members 148 which are secured thereto. These members taper outward and are formed with guide sections 149 at their forward extremities which normally engage in the bevelled notches 106 of the die 103. In their forward position the cam members lift the die 103 as hereinafter described, and are received in clearance notches 151 in the stationary jig block 66 (Figs. 7 and 8).

Operation of the die mechanism

In the formation of the interlocking joints of the open end headers O, the extremities of the ribbon sections 30 and 40 are clamped, as previously described, with their ends 34 and 35 protruding into the clearance notch of the die 107. The bracket 116 is then swung to its horizontal position, during which the die plate 122 thereon first engages the end 34 and bends it over the rear face of the united jig blocks 79 and 81, and subsequently bends the extremity of this ribbon portion horizontally in cooperation with the underlying die 103, thus defining the joint sections 36 and 38. Simultaneously with this operation, the end 35 is turned up, with the forward edge of the die 107 acting as the fulcrum to define the sections 37 and 39. The die 107 is retained in proper position for this operation by the cam member 123, the forward edge 130 of which engages the rear surface of the die 107, and thus fixes the rearward position of the die 107 so that it may properly coact with the die plate 122.

In the second operation (Fig. 10) the bracket 116 is lifted sufficiently to clear the dies, without tripping the trigger 139, and, during this movement the face 124 of the cam member 123 engages the cam bead 112 and swings the die 107 forward, so that its projecting portion 109 engages the vertically disposed section 39 and moves it slightly inward.

The bracket is again swung downward in the next operation (Fig. 11), whereupon the lower face of the die plate 122 forces the bent section 39 down upon the underlying superimposed sections 37 and 38, with the die 103 acting as an anvil therefor.

The bracket 116 is finally moved slowly to its vertical inoperative position (Fig. 12). During the first part of this return movement, the pin 146 engages therein the finger 142 and lifts the latch bar 136 out of engagement with the stop member 144. Thus the horizontal die 125 is freed for spring actuated movement toward the dies 107, 103, where first the wedge members 148 thereon engage the bevelled notches 106 and bodily elevate the die 103 under guidance of shouldered portions 101, such action resulting in the engagement of the sections 37, 38, and 39 by the die 103 to a position adjacent the section 36. The subsequent impact of the die 125 on the face of the then elevated die 107 results in the compression of the joint against the rear face of the united jig blocks 79 and 81 to provide an extremely tight interlocking joint.

The raising of the bracket 112 to its full vertical position again restores the die 125 to its retracted position, whereupon the jig may be opened to remove the completed outer ribbon.

The solder feeding mechanism

This mechanism is actuated by the cooperative action of both the hinged jig block 72 and the pivoted die bracket 116 (Figs. 13 to 16), and it comprises a fixed head or pedestal 156 secured to the top 61 adjacent the right hand bearing block 119 and formed on one side with a protruding shank 157. A cylindrical bar 158 is secured in the opposite face of the pedestal and it projects toward the center of the die mechanism. A reciprocating head 159 is formed with a rectangular opening which slidably receives the shank 157.

The pedestal 156, bar 158, and head 159 contain aligned horizontal holes 161, 162, 163, respectively, through which solder wire 160 obtained from a suitable reel is threaded. The pedestal and head are each provided with a clutch 164 (Fig. 16) consisting of a plate 165 inserted in the top wall of each (Fig. 16) and formed with a notch 166 having an angular wall 167. A roller 168 containing a central groove 169 for engaging the solder wire is positioned in the notch. It will be apparent that with this arrangement the wire may be fed through the pedestal toward the bar 158 (from right to left, Fig. 14) without resistance from the clutch, while upon retrograde movement of the wire, the roller 168 will be wedged between the slot wall 167 and the wire, and thus effectively prevent further movement.

A reciprocating movement is imparted to the head 159 through a lever system including a bell crank 171 pivoted to the front face of the pedestal 156 by a stud 172 and having one end of a link 173 pivotally secured to its arm 174 by a stud 175. The opposite end of the link is secured to the head 159 by a stud 176. A second lever 177 is pivotally mounted on a side face of the pedestal 156 by a stud 178, and its forward arm 179 is disposed beneath the short arm 181 of the bell crank 171, while its remaining arm 182 is disposed adjacent to the right hand bearing portion 118 of the bracket 116.

This bearing portion is provided with a pin 184, which, when the bracket 116 is rotated from its vertical position (Figs. 8 and 13) to its horizontal position, moves the lever arm 182 downward, and the short or forward arm 179 upward into active engagement with the overlying short arm 181 of the bell crank. The long arm 174 of the bell crank 171 is thus moved to the right (Fig. 14) carrying with it the link 173 and head 159. During this movement the wire is not acted upon and remains stationary, due to the holding reaction on the pedestal clutch and the releasing action on the head clutch.

During the sequence of bending operations heretofore described, the bracket 116 is subsequently restored to its vertical position, immediately after which the pivoted jig block 72 is similarly raised to permit removal of the completed outer. One of the hinge lugs 74 is provided with a heel 185, which, during the end period of the latter movement, swings into engagement with the top of the short arm 181 of the bell crank 171 and depresses it, thus causing a counter-clockwise rotation of the bell crank and the resulting movement of the head toward the pedestal 156. In this return stroke of the head, the clutch thereof grips the wire which is carried therewith and the wire is thus fed through the pedestal 156 and bar 158.

The solder positioning device

A solder shearing and conveying device is mounted on the pivoted jig block 72 (Figs. 5, 8, 15 and 17) and it is constructed of a plate 186 inserted in the rear face 73 of this block with its right hand edge 187 positioned to engage slidably the end face 188 of the bar 158, when the block 72 is moved from its vertical position, thus providing a shearing action between the edge 187 and the solder wire section 44 projecting from the bar 158. The plate contains a wide notch 189 (Fig. 17) on its lower extremity, underlying which the face 73 is recessed as indicated by the numeral 191. A pair of spaced fingers 192 are secured to the rear face of the plate and their extremities 193 are curved inward and overlie the notch 189. The plate also contains a pair of spaced notches 194 in its upper edge.

The rear face of the plate is provided with a pair of small protruding bearing portions 195 disposed adjacent the surface of the jig block. A jaw 196 is provided with a drilled extremity 197 which is received between the bearing portions 195 and which receives in common therewith a hinge pin 198. A torsion spring 199 is disposed about the pin 198 and it engages the jaw and tends to retain it in engagement with the plate 186. Curved prongs 200 are secured to the jaw and they project toward the plate 186, which prongs, when the jaw is closed, are received in the clearance slots 194.

Arms 201 and 202 are secured to the front or exposed face of the jaw 196 and protrude from opposite sides thereof, the latter arm being disposed to engage the cylindrical bar 158 when the jig block is in a vertical position (Fig. 15), thus opening the jaw against the action of the spring 199. The arm 201 is operated to open the jaw when the jig block 72 is in its horizontal or clamping position (Fig. 8). This is accomplished by means of a push pin 203 slidably mounted in a hole 204 in the block 72 and retained in a position protruding from the lower face of the block by a spring 205 which engages a shouldered portion 206 thereof. When the pivoted jig block 72 is moved to its horizontal clamping position, the pin portion 206 engages the underlying jig block 79 and it is thrust upward, so that its upper extremity 207 moves the arm 201 outward and thus opens the jaw 196.

Figure 15:
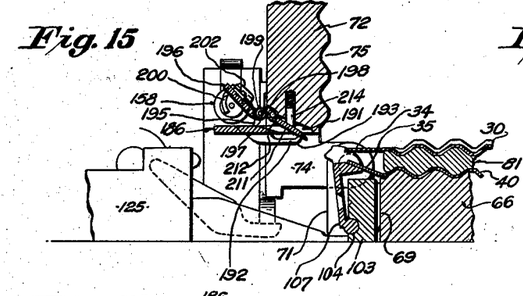
Fig. 15 is a fragmentary section on the line 15—15 of Fig. 5.
Figure 16:
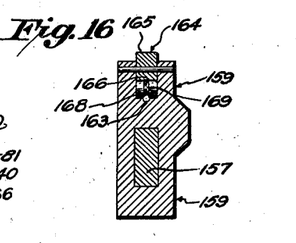
Fig. 16 is a section on the line 16—16 of Fig. 14.
Figure 17:
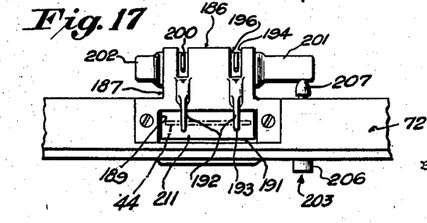
Fig. 17 is an enlarged fragmentary rear view of the pivoted jig block.

The notch 191 in the jig block 72 contains a guide plate 211 which is pivotally mounted by a pin 212 (Fig. 15). The upper or hinge end of this plate is spaced from the plate 186, while its free end is retained against the extremities 193 of the fingers 192 by a spring-pressed plunger 214.

*Operating relation of jigs and forming dies to the solder feeding and positioning mechanisms*

Figure 14:
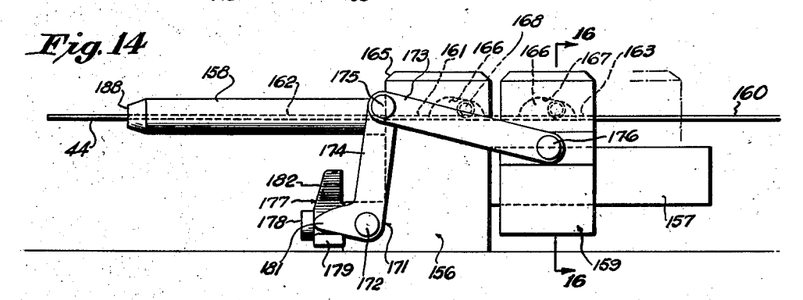
Fig. 14 is a front elevation of the solder feeding mechanism.

In the open or inoperative position of the machine elements (Figs. 5 and 6) the solder feeding mechanism has been brought to the position shown in Fig. 14 through the described cooperating action of the hinged jig block 72. In this position a length 44 of solder protrudes from the bar 158, and, as shown in Fig. 15, the plate 186 on the block 72 is positioned immediately beneath the solder length. After the operation of positioning the ribbons in the remaining jig elements, the block 72 is swung downward, thus causing the edge 187 of the plate 186 to shear the solder length, the hinged jaw 196 during this movement being released to engage and retain the length between its face and the face of the plate 186.

The solder length 44 thus retained is carried with the block 72 in its closing movement, until the pin 203 strikes the block 99 (Fig. 8), causing the opening movement of the jaw 196, and the release of the solder length. Aided by the prongs 200, the solder then is permitted to drop by gravity between the jaw and plate and finally between the plate 186 and the guide plate 211, to a final position between the guide plate and the extremities 193 of the fingers 192.

The subsequent downward movement of the pivoted die unit 115 for the first bending operation (Fig. 9) causes the engagement of the ejector 216 therein with the solder length, whereupon the solder is carried with it and deposited on the surface of the ribbon section 39. This action is accompanied by the displacement of the guide plate 211 to permit the release of the solder from the holding fingers 192. The notches 219 are provided in the die plate 122 to clear the fingers during this operation.

The impact of the dies during the first folding operation flattens the solder insert on the bent section 39 and the subsequent bending operations (Figs. 10, 11, and 12) securely imprison the insert in the center of the joint where it cannot be displaced and where it may fuse and spread to all portions of the joint.

During the same downward movement of the pivoted die unit 115, the pin 184 therein actuates the lever 177 and thus through the bell crank 171 and link 173 moves the head 159 to its outer position (dotted lines Fig. 14). Upon completion of the ribbon joint and the subsequent return movement of the pivoted jig block 72, the heel 185 operates the bell crank 171 in the opposite direction, thus moving the head inward and causing another length of solder to be projected from the bar 158. Of course, this action is timed to occur after the shear plate 186 has passed the center of the bar. This action completes the cycle and it will be observed that the machine is now prepared for the reception of a new ribbon unit, and likewise the new solder length is positioned to be conveyed thereto.

It will be understood that the machine herein described is used for forming joints in one particular type of ribbon, whereas in other forms of ribbons for cellular radiators many variations of the operating principles thereof may be utilized, together with the solder feeding device, without departing from the scope of the invention, as set forth in the following claims.

I claim:

1. The combination with a joint forming mechanism for radiator ribbons having a bending die mechanism including a holding jig for the ribbons and bending dies for forming the joint, of a mechanism for feeding a predetermined length of solder wire, cooperative means on the holding jig and bending dies for operating said feeding mechanism in timed relation therewith, and solder shearing and positioning means on the jig and dies for inserting the wire lengths in the joint during the formation thereof.

2. The combination with a joint forming mechanism for radiator ribbons having a bending die mechanism including a holding jig for the ribbons and bending dies for forming the joint, of a mechanism for feeding predetermined lengths of solder wire, comprising a fixed head having a wire passage therethrough, a reciprocating head having a wire passage therethrough, a wire gripping clutch in each head operative to prevent movement of the wire in one direction, cooperative means on the jig and bending dies for operating the reciprocatory head in timed relation therewith, solder shearing means on the jig adapted to cut off the length of wire projected from the passage in the fixed head, and cooperative solder positioning means in the jig and bending dies for inserting the cut wire length in the joint during the formation thereof.

3. The combination with a joint forming mechanism for radiator ribbons having a bending die mechanism including a holding jig for the ribbons and bending dies for forming the joint, of a reciprocatory solder wire feeding mechanism having a solder feeding stroke and a return stroke, mechanism operated by and during the operative movement of the dies and opening movement of the jig for operating the feeding mechanism for its feeding and return strokes respectively, and solder shearing and positioning means on the die mechanism for cutting the fed solder and inserting it in the joint during the formation thereof.

4. In a joint forming mechanism for radiator ribbons, a holding jig including a fixed block for receiving a ribbon thereon with an extremity thereof projecting, movable blocks for covering the ribbon and for receiving a second ribbon thereon with an end projecting and a pivoted block for covering the second ribbon, bending dies positioned adjacent the protruding ribbon ends for forming a joint therein, solder feeding means operated by and during movement of the bending dies for projecting a length of solder wire in the proximity of the pivoted block when said block is in open position, a shear positioned on the pivoted block and adapted to cut off the projected wire during closing movement of the block, wire gripping means on the pivoted block for positioning the solder over the protruding end of the upper ribbon, and means on the dies for engaging the wire and impinging it upon the ribbon ends during the joint forming operation.

5. In a joint forming mechanism for radiator ribbons, a holding jig mechanism comprising a plurality of superimposed blocks, each pair of adjacent blocks adapted to receive a ribbon therebetween with an end protruding therefrom, bending dies positioned adjacent the protruding ribbon ends for forming a joint therein, and means operated by and during operation of the jig mechanism and bending dies for projecting a length of solder wire in one of the ribbon ends.

6. In a joint forming mechanism for radiator ribbons, a holding jig mechanism, comprising a plurality of superimposed blocks, each pair of adjacent blocks adapted to receive a ribbon therebetween with an end protruding therefrom, the uppermost of said blocks being mounted for pivotal movement, bending dies positioned adjacent the protruding ribbon ends for forming a joint therein, solder feeding means operated by and during movement of the bending dies for projecting a length of solder wire in the proximity of the pivoted block when said block is in open position, a shear positioned on the pivoted block and adapted to cut off the projected wire during closing movement of the block, spring-pressed jaws releasable upon movement of the block for retaining the cut-off wire, means for releasing the jaws upon final closing movement of the block, wire positioning means for engaging the released wire, and means on the dies for engaging the positioned wire and impinging it on the ribbon ends during the joint forming operation.

7. The combination with a joint forming mechanism for radiators including movable jig means for holding the ribbons in position and closable dies for forming a joint in the ribbons, of feeding means operated by and during operation of said mechanism for introducing lengths of solder wire into the proximity of the ribbons, and solder positioning means formed in said dies for receiving solder lengths from the feeding means for introduction into the joint formed by said dies.

STANISLAUS PRZYBOROWSKI.